United States Patent
Glos et al.

(10) Patent No.: US 8,906,974 B2
(45) Date of Patent: Dec. 9, 2014

(54) METHOD FOR PRODUCING POLYURETHANE FOAM

(75) Inventors: Martin Glos, Borken (DE); Carsten Schiller, Muelheim an der Ruhr (DE); Christian Eilbracht, Herne (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/378,169

(22) PCT Filed: Jun. 29, 2010

(86) PCT No.: PCT/EP2010/059190
§ 371 (c)(1),
(2), (4) Date: Dec. 14, 2011

(87) PCT Pub. No.: WO2011/012390
PCT Pub. Date: Feb. 3, 2011

(65) Prior Publication Data
US 2012/0088856 A1    Apr. 12, 2012

(30) Foreign Application Priority Data
Jul. 29, 2009 (DE) .......................... 10 2009 028 061

(51) Int. Cl.
*C08J 9/14* (2006.01)
*C08J 9/12* (2006.01)
*C08J 9/04* (2006.01)
*C08K 5/54* (2006.01)
*C08G 18/40* (2006.01)

(52) U.S. Cl.
USPC ........... 521/111; 521/112; 521/131; 521/155; 521/170

(58) Field of Classification Search
USPC .......................... 521/111, 112, 131, 155, 170
See application file for complete search history.

(56) References Cited

U.S. PATENT DOCUMENTS

| | | | |
|---|---|---|---|
| 2,846,458 A * | 8/1958 | Haluska | ........................ 556/445 |
| 5,900,185 A | 5/1999 | Tapscott | |
| 6,166,098 A | 12/2000 | Burkhart et al. | |
| 7,671,103 B2 | 3/2010 | Eilbracht et al. | |
| 7,829,647 B2 | 11/2010 | Bruckner et al. | |
| 7,838,566 B2 | 11/2010 | Glos et al. | |
| 2007/0021581 A1 | 1/2007 | Eilbracht et al. | |
| 2007/0123599 A1 | 5/2007 | Eilbracht et al. | |
| 2008/0076842 A1 | 3/2008 | Ferenz et al. | |
| 2008/0125503 A1 | 5/2008 | Henning et al. | |
| 2008/0125505 A1 | 5/2008 | Bowman et al. | |
| 2008/0125506 A1 | 5/2008 | Bowman et al. | |
| 2008/0146688 A1 | 6/2008 | Glos et al. | |
| 2008/0207788 A1 | 8/2008 | Bowman et al. | |
| 2009/0088488 A1 | 4/2009 | Bruckner et al. | |
| 2009/0099272 A1 | 4/2009 | Williams et al. | |
| 2009/0099273 A1 | 4/2009 | Williams et al. | |
| 2010/0029587 A1 | 2/2010 | Bruckner et al. | |
| 2010/0036011 A1 | 2/2010 | De Gans et al. | |
| 2010/0071849 A1 | 3/2010 | Knott et al. | |
| 2010/0113633 A1 | 5/2010 | Henning et al. | |
| 2010/0240786 A1 | 9/2010 | Glos et al. | |
| 2010/0249982 A1 | 9/2010 | Chang et al. | |
| 2010/0292357 A1 | 11/2010 | Knott et al. | |
| 2010/0298455 A1 | 11/2010 | Henning et al. | |
| 2011/0028578 A1 | 2/2011 | Glos | |
| 2011/0034576 A1 | 2/2011 | Henning et al. | |
| 2011/0054055 A1 | 3/2011 | Schmitz et al. | |
| 2011/0062370 A1 | 3/2011 | Eilbracht et al. | |

FOREIGN PATENT DOCUMENTS

| | | |
|---|---|---|
| DE | 10 2006 038 661 A1 | 2/2008 |
| EP | 1 211 279 A1 | 6/2002 |
| EP | 1 520 870 A1 | 4/2005 |
| EP | 2 004 773 | 12/2008 |
| JP | 2005113138 A | 4/2005 |
| WO | WO 2007/002703 A2 | 1/2007 |
| WO | WO 2007/053670 A2 | 5/2007 |
| WO | WO 2007/126414 A2 | 11/2007 |
| WO | WO 2008/121779 A1 | 10/2008 |
| WO | WO 2008/121790 A1 | 10/2008 |
| WO | WO 2009/003165 A1 | 12/2008 |
| WO | 2009048826 A2 | 4/2009 |

(Continued)

OTHER PUBLICATIONS

Andrew, Gary et al., "Surfactant Technology for Low Density Molded Microcellular and Flexible Polyurethane Systems", PU Latin America 2001, Technical Update 4: Footwear and CASE Paper 8, p. 1.

(Continued)

*Primary Examiner* — Rabon Sergent
(74) *Attorney, Agent, or Firm* — Scully, Scott, Murphy & Presser, P.C.

(57) ABSTRACT

A method for producing polyurethane foams by reacting at least one organic isocyanate moiety, at least one polyol, a blowing agent consisting of halogen-containing (fluorine-containing) olefins and at least a siloxane of Formula I

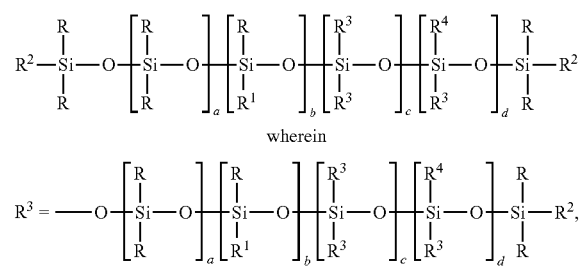

b, c and d are defined herein, as well as compositions made by said method are described.

12 Claims, No Drawings

(56) References Cited

FOREIGN PATENT DOCUMENTS

| | | |
|---|---|---|
| WO | WO 2009/067720 A2 | 5/2009 |
| WO | WO 2009/073487 A1 | 6/2009 |
| WO | WO 2009/089400 A1 | 7/2009 |

OTHER PUBLICATIONS

International Search Report dated Dec. 14, 2010 issued in PCT/EP2010/059190.

Japanese Office Action dated Dec. 3, 2013 issued in JP 2012-522061, together with English translation.

* cited by examiner

METHOD FOR PRODUCING POLYURETHANE FOAM

The present invention relates to a method for producing polyurethane foam using compounds bearing olefinic double bonds as blowing agents and polyether-siloxane copolymers, to polyurethane foams containing these blowing agents and siloxane copolymers, and also to the use of these polyurethane foams.

PRIOR ART

Halogenated hydrocarbons and particularly fluorinated hydrocarbons have found wide utility as blowing agents for production of foams. Yet these compounds have disadvantages with regard to their Ozone Depletion Potential (ODP) and Global Warming Potential (GWP). Alternative blowing agents with lower ODP and GWP have therefore been developed. The current trend is to use halogenated compounds having an olefinic double bond in the molecule—that is, hydrohaloolefins (HHOs). More particularly, hydrofluoroolefins (HFOs) and hydrochlorofluoroolefins (HCFOs) are being described as new blowing agents.

US 2008/125505 and US 2008/125506 describe the use of fluorinated olefins as blowing agents for foams. These blowing agents have a low GWP and ODP.

WO 2008/121790 describes mixtures of hydrofluoroolefins (HFOs) and hydrochlorofluoroolefin (HCFO) as blowing agents for production of foams.

WO 2008/121779 describes a blowing agent composition containing at least one hydrochloroolefin.

WO 2007/053670 describes blowing agents for production of foams containing unsaturated fluorocarbons. Bromofluoroolefins are also mentioned.

The WO 2009/073487 and WO 2009/089400 applications describe cis-1,1,1,4,4,4-hexafluoro-2-butene and 2-chloro-3,3,3-trifluoropropene respectively, as blowing agents in the production or polyurethane and polyisocyanurate foams.

EP 2 004 773 describes a composition for use in refrigeration, air-conditioning or heat pump apparatus, containing a fluoroolefin and at least one further component. The use as foam-blowing agent is also described inter alia.

U.S. Pat. No. 5,900,185 describes bromine-containing olefins having short atmospheric lifetimes and inter alia the use thereof as blowing agents for foams.

WO 2007/002703 and US 2008/207788 and WO 2009/067720 describe HFO-1234ze and HCFO-1233zd and, respectively, mixtures containing these substances together with fluorinated ethers, in various applications including the use as blowing agents for PU foams.

WO 2009/003165 describes mixtures of hydrofluoroolefins (HFOs) and/or hydrochlorofluoroolefin (HCFO) with stabilizers that prevent degradation during storage, handling and use yet allow degradation in the atmosphere. The stabilizers used are free-radical scavengers, oxygen scavengers, acid scavengers and also polymerization inhibitors.

Also described in this reference is a damaging effect of blowing agent disintegration products on the siloxanes used. However, there is no description of specific siloxane structures, also called silicone surfactants.

US 2009/0099272 describes the use of acid/amine adducts as a catalyst in systems comprising olefinic fluorinated blowing agents, since free amines react with the blowing agents and these products then decompose the silicone surfactants. This distinctly limits possibilities in relation to the production of a foam formulation, since the catalytic effect of the amines is weakened here, which results in a longer reaction time for the PU foam formulation.

US 2009/0099273 describes the use of silicon-free surfactants in order to avoid the problem with the reaction products formed from amine and fluorinated blowing agents. This means that only a limited number of surfactants can be used.

Both alternatives represent a substantial limitation in relation to PU foam production. Therefore, there is a need for siloxanes which are free of the disadvantages described above and are useful as silicone surfactants in the production of PU foam.

This invention has for its object to provide siloxanes which, when halogenated olefins are used as blowing agents, do not have the abovementioned disadvantages and hence lead to improved results.

It has now been found that, surprisingly, this object is achieved by siloxanes of formula (I).

The selected siloxanes of formula (I) do include the typical structural elements of siloxanes already described in the prior art, but differ in the selection range for the number of structural features. It is utterly surprising to and unforeseeable by a person skilled in the art that it was possible to find specific siloxanes capable of performing siloxane-typical functions in foaming without additional free-radical scavengers for example or even in the presence of non-acid-blocked amines.

The present invention accordingly provides a method for producing polyurethane foams using blowing agents consisting of halogenated olefins and siloxanes of formula (I). These siloxanes of formula (I) can also be generated as a mixture in a suitable carrier medium. These mixtures can be present as-produced or else be obtainable subsequently in order, for example, to facilitate meterability of the siloxanes or else to improve incorporability of the siloxanes into the mixture to be foamed.

The present invention further provides polyurethane foams and a method for producing polyurethane foams in each of which the subject compositions comprising the blowing agents and siloxanes are used. The present invention also provides for the use of polyurethane foams which are in accordance with the present invention and/or are obtained in accordance with the present invention.

The method of the present invention has the advantage that optionally preformulated mixtures of polyols and/or catalysts, water/blowing agents, the foam stabilizer and optionally further additives, that are marketed as ready-to-use polyurethane foam systems, survive the commercially customary storage periods without deterioration in foam properties. This applies particularly to 1-component systems in which the isocyanate is also included in the preformulated mixture.

The polyurethane foam of the present invention has the advantage of consistently high quality, i.e., a particularly fine cellular structure with particularly few foam defects (voids, cracks, densifications).

The siloxanes of the present invention have the following structure:

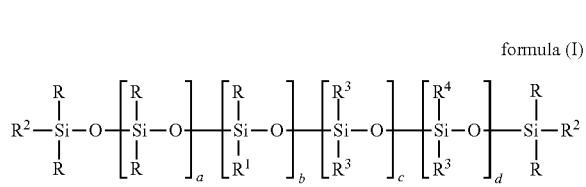

formula (I)

-continued

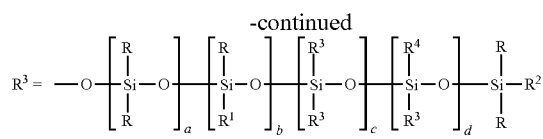

where a in each occurrence independently is from 0 to 500, preferably from 1 to 300 and particularly from 2 to 150, b in each occurrence independently is from 0 to 60, preferably from 1 to 50 and particularly from 1 to 30, c in each occurrence independently is from 0 to 10, preferably 0 or >0 to 5, d in each occurrence independently is from 0 to 10, preferably 0 or >0 to 5, with the proviso that, per molecule of formula (I), the average number Σd of T-units and the average number Σc of Q-units per molecule are neither greater than 50, the average number Σa of D-units per molecule is not greater than 2000 and the average number Σb of $R^1$-bearing siloxy units per molecule is not greater than 100, R in each occurrence independently is one or more than one moiety from the group of linear, cyclic or branched, aliphatic or aromatic, saturated or unsaturated hydrocarbon moieties having 1 up to 20 carbon atoms, but preferably methyl, $R^2$ in each occurrence independently is $R^1$ or R, $R^1$ is unlike R and in each occurrence independently is an organic moiety and/or a moiety selected from the group —$CH_2$—$CH_2$—$CH_2$—O—($CH_2$—$CH_2$O—)$_x$—($CH_2$—CH(R')O—)$_y$—R"

—$CH_2$—$CH_2$—O—($CH_2$—$CH_2$O—)$_x$—($CH_2$—CH(R')O—)$_y$—R"

—$CH_2$—$R^{IV}$

—$CH_2$—$CH_2$—(O)$_{x'}$—$R^{IV}$

—$CH_2$—$CH_2$—$CH_2$—O—$CH_2$—CH(OH)—$CH_2$OH

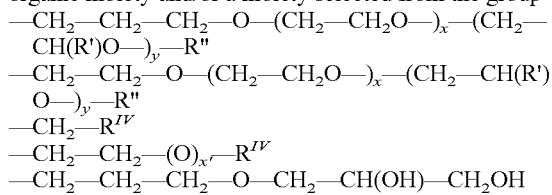

or

—$CH_2$—$CH_2$—$CH_2$—O—$CH_2$—C($CH_2$OH)$_2$—$CH_2$—$CH_3$, where x is from 0 to 100, preferably >0 and particularly from 1 to 50, x' is 0 or 1, y is from 0 to 100, preferably >0 and particularly from 1 to 50, z is from 0 to 100, preferably >0 and particularly from 1 to 10, R' in each occurrence independently is an alkyl or aryl group of 1 to 12 carbon atoms which is optionally substituted, for example with alkyl moieties, aryl moities or haloalkyl or haloaryl moieties, wherein within an $R^1$ moiety and/or a molecule of formula (I) mutually different substituents R' can be present, and R" in each occurrence independently is hydrogen or an alkyl group of 1 to 4 carbon atoms, a —C(O)—R'" group where R'"=alkyl, a —$CH_2$—O—R' group, an alkylaryl group, e.g., benzyl, a —C(O)NH—R' group, $R^{IV}$ is a linear, cyclic or branched, including further substituted, e.g., halogen-substituted, hydrocarbon moiety having 1 to 50, preferably 9 to 45 and more preferably 13 to 37 carbon atoms, $R^4$ in each occurrence independently may be R, $R^1$ and/or a heteroatom-substituted, functionalized, organic, saturated or unsaturated moiety selected from the group of alkyl, aryl, chloroalkyl, chloroaryl, fluoroalkyl, cyanoalkyl, acryloyloxyaryl, acryloyloxyalkyl, methacryloyloxyalkyl, methacryloyloxypropyl or vinyl, with the proviso that at least one substituent from $R^1$, $R^2$ and $R^4$ is other than R.

The various monomer units of the siloxane and polyoxyalkylene chains indicated in the formulae can have a mutually blockwise construction with any number of blocks and any sequence, or have a random distribution. The indices used in the formulae shall be regarded as statistical averages.

The siloxane-containing mixtures of the present invention may contain further substances. More particularly, the compositions of the present invention may contain further additives/auxiliaries of the type used in polyurethane foam production. Preferred additives/auxiliaries for inclusion in the compositions of the present invention are preferably selected from conventional SiOC and SiC stabilizers, organic foam stabilizers, surfactants, nucleating agents, cell-refining additives, cell-opening agents, crosslinkers, emulsifiers, flame retardants, antioxidants, antistats, biocides, color pastes, solid fillers, amine catalysts, metal catalysts, polyols and/or buffers.

It may also be advantageous for the composition of the present invention to contain a solvent, more particularly an organic solvent, preferably a solvent selected from glycols, alkoxylates and oils of synthetic and/or natural origin.

The siloxanes of formula (I) are prepared by the familiar methods such as, for example, the noble metal catalyzed hydrosilylation reaction of compounds containing a double bond with appropriate hydrosiloxanes as described in EP 1 520 870, for example. The EP 1 520 870 document is hereby incorporated by reference and shall be deemed to form part of the disclosure content of the present invention.

Useful compounds having one or more than one double bond per molecule include α-olefins, vinylpolyoxyalkylenes and/or allylpolyoxyalkylenes. Preference is given to using vinylpolyoxyalkylenes and/or allylpolyoxyalkylenes. Particularly preferred vinylpolyoxyalkylenes are, for example, vinylpolyoxyalkylenes having a molecular weight in the range from 100 g/mol to 5000 g/mol, which may be constructed from the monomers propylene oxide, ethylene oxide, butylene oxide, and/or styrene oxide in blockwise or in random distribution and which may be not only hydroxy functional but also endcapped by a methyl ether function or an acetoxy function. Particularly preferred allylpolyoxyalkylenes are, for example, allylpolyoxyalkylenes having a molecular weight in the range from 100 g/mol to 5000 g/mol, which may be constructed from the monomers propylene oxide, ethylene oxide, butylene oxide, and/or styrene oxide blockwise or in random distribution and may be not only hydroxy functional but also endcapped by a methyl ether function or an acetoxy function. Particular preference for use as compounds having one or more than one double bond per molecule is given to the exemplified α-olefins, allyl alcohol, 1-hexenol, vinylpolyoxyalkylenes and/or allylpolyoxyalkylenes and also allyl glycidyl ether and vinylcyclohexene oxide.

The method of the present invention preferably utilizes siloxanes of formula (I) where a in each occurrence independently is from 1 to 300, b in each occurrence independently is from 1 to 50, c in each occurrence independently is from 0 to 4, d in each occurrence independently is >0 to 4, with the proviso that, per molecule of formula (I), the average number Σd of T-units and the average number Σc of Q-units per molecule are neither greater than 20, the average number $\Sigma a$ of D-units per molecule is not greater than 1500 and the average number $\Sigma b$ of $R^1$-bearing siloxy units per molecule is not greater than 50.

A particularly preferred embodiment of the method according to the present invention utilizes siloxane of formula (I) where $R^1$ in each occurrence independently is an organic moiety —$CH_2$—$CH_2$—$CH_2$—O—($CH_2$—$CH_2$O—)$_x$—($CH_2$—CH(R')O—)$_y$—R"  —$CH_2$—$CH_2$O—($CH_2$—$CH_2$O—)$_x$—($CH_2$—CH(R')O—)$_y$—R" —$CH_2$—$R^{IV}$ where x is from 0 to 100, preferably >0 and particularly from 1 to 50 and y is from 0 to 100, preferably >0 and particularly from 1 to 50, R' in each occurrence independently may be different and is methyl, ethyl and/or phenyl. R" in each occurrence independently is hydrogen or an alkyl group of 1 to 4 carbon atoms, a —C(O)—R''' group where R'''=alkyl, a —$CH_2$—O—R' group, an alkylaryl group, e.g., benzyl, a —C(O)NH—R' group, $R^{IV}$ is a linear, cyclic or branched, optionally substituted, e.g., halogen-substituted, hydrocarbon moiety having 1 to 50, preferably 9 to 45 and more preferably 13 to 37 carbon atoms A further preferred embodiment of the method utilizes siloxanes of formula (I) where $R^1$ in each occurrence independently is an organic moiety selected from the group comprising —$CH_2$—$CH_2$—$CH_2$—O—($CH_2$—$CH_2$O—)$_x$—($CH_2$—CH(R')O—)$_y$—R''' and/or —$CH_2$—$CH_2$—O—($CH_2$—$CH_2$O—)$_x$—($CH_2$—CH(R')O—)$_y$—R" and/or —$CH_2$—$R^{IV}$, where x is from 0 to 100, preferably >0 and particularly from 1 to 50, $R^1$ is from 0 to 100, preferably >0 and particularly from 1 to 50, $R^1$ is methyl and R" in each occurrence independently is hydrogen or an alkyl group of 1 to 4 carbon atoms, a —C(O)—R''' group where R'''=alkyl, a —$CH_2$—O—R' group, an alkylaryl group, e.g., benzyl, a —C(O)NH—R' group, wherein the molar fraction of oxyethylene units comprises at least 70% of the oxyalkylene units, i.e., x/(x+y) is >0.7. It may further be advantageous for the polyoxyalkylene chain to bear a hydrogen at the end and at the same time for the molar fraction of oxyethylene units to comprise at most 70% of the oxyalkylene units, i.e., x/(x+y) is <0.7 and R''' is hydrogen.

A further preferred embodiment of the method according to the present invention uses siloxanes of formula (I) in each of which the hydrosilylation utilizes inter alia olefins whereby $R^1$ consists of —$CH_2$—$R^{IV}$ to an extent of at least 10 mol %, preferably at least 20 mol % and more preferably at least 40 mol %, wherein $R^{IV}$ is a linear or branched hydrocarbon having 9 to 17 carbon atoms.

A further preferred embodiment of the method according t the present invention uses siloxanes of formula (I) in each of which the end positions on the siloxane, i.e., the alpha and omega positions, are at least partly functionalized with $R^1$. At least 10 mol %, preferably at least 30 mol % and more preferably at least 50 mol % of the end positions are functionalized with $R^1$ moieties.

A particularly preferred embodiment of the method according to the present invention utilizes siloxanes of formula (I) in each of which statistically on average at most 50%, preferably at most 45% and more preferably at most 40% of the entire average molecular weight of the siloxane is accounted for by the summed molar mass of all, optionally different, $R^1$ moieties in the siloxane.

A further preferred embodiment of the method according to the present invention uses siloxanes of formula (I) in each of which R is methyl and the number of structural elements having the index a is larger than the number of structural elements having the index b such that the a/b ratio is not less than 7, preferably above 10 and more preferably above 12.

A further preferred embodiment of the method according to the present invention uses siloxanes of formula (I) in each of which the oxyalkylene units in $R^1$ are exclusively oxyethylene units and R" is not hydrogen.

A further preferred embodiment of the method according to the present invention uses siloxanes of formula (I) having no or statistically on average less than one branch in the siloxane scaffold and which accordingly satisfy the inequality $\Sigma c + \Sigma d < 1$.

A further preferred embodiment of the method according to the present invention uses siloxanes of formula (I) which have one or more than one branch in the siloxane scaffold statistically on average and hence satisfy the inequality $\Sigma c + \Sigma d \geq 1$.

The siloxanes of the present invention can also be used as part of compositions comprising various carrier media. Examples of possible carrier media are glycols, alkoxylates or oils of synthetic and/or natural origin. The amount of composition added is preferably sufficient for the mass fraction of compounds of formula (I) in the final polyurethane foam to be in the range from 0.01% to 10% by weight and preferably in the range from 0.1% to 3% by weight.

The compositions of the present invention are useful as foam stabilizers in the customary formulations for production of polyurethane foams, consisting of one or more organic isocyanates having two or more isocyanate functions, one or more polyols having two or more isocyanate-reactive groups, catalysts for the isocyanate-polyol and/or isocyanate-water reactions and/or the isocyanate trimerization, water, optionally physical blowing agents, optionally flame retardants with or without further additives.

Suitable isocyanates for the purposes of this invention are any polyfunctional organic isocyanates, for example 4,4'-diphenylmethane diisocyanate (MDI), toluene diisocyanate (TDI), hexamethylene diisocyanate (HMDI) and isophorone diisocyanate (IPDI). What is particularly suitable is the mixture of MDI and more highly condensed analogs having an average functionality in the range from 2 to 4 which is known as "polymeric MDI" (crude MDI) as well as the various isomers of TDI in pure form or as isomeric mixture.

Suitable polyols for the purposes of this invention are any organic substances having two or more isocyanate-reactive groups, and also preparations thereof. Any polyether polyols and polyester polyols customarily used for producing polyurethane foams are preferred polyols. Polyether polyols are obtainable by reaction of polyfunctional alcohols or amines with alkylene oxides. Polyester polyols are based on esters of polybasic carboxylic acids (which may be either aliphatic, as in the case of adipic acid for example, or aromatic, as in the case of phthalic acid or terephthalic acid for example) with polyhydric alcohols (usually glycols).

A suitable ratio of isocyanate to polyol, expressed as the index of the formulation, i.e., as stoichiometric ratio of isocyanate groups to isocyanate-reactive groups (e.g., OH groups, NH groups) multiplied by 100 is in the range from 10 to 1000 and preferably in the range from 80 to 350.

Suitable catalysts for the purposes of this invention are substances that catalyze the gel reaction (isocyanate-polyol), the blowing reaction (isocyanate-water) or the di- or trimerization of isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl) hexahydro-1,3,5-triazine, dimethylaminoethanol, dimethylaminoethoxyethanol and bis(dimethylaminoethyl)

ether, and also metal-containing compounds such as, for example, tin compounds like dibutyltin dilaurate or tin(II) 2-ethylhexanoate and potassium salts like potassium acetate and potassium 2-ethylhexanoate.

Suitable use levels depend on the type of catalyst and lie typically in the range from 0.05 to 5 pphp (=parts by weight per 100 parts by weight of polyol) or from 0.1 to 10 pphp for potassium salts.

Suitable water contents for the purposes of this invention depend on whether water is or is not used in addition to the halogenated olefin. Typically, water quantities from 0.1 to 5 pphp are used.

In addition to the abovementioned halogenated olefins, further suitable physical blowing agents can also be used. These are for example liquefied $CO_2$ and volatile liquids, for example hydrocarbons having 4 or 5 carbon atoms, preferably cyclopentane, isopentane and n-pentane, hydrofluorocarbons, preferably HFC 245fa, HFC 134a and HFC 365mfc, hydrochlorofluorocarbons, preferably HCFC 141b, oxygen-containing compounds such as methyl formate and dimethoxymethane, or hydrochlorocarbons, preferably dichloromethane and 1,2-dichloroethane.

In addition to water and physical blowing agents, other chemical blowing agents can also be used to react with isocyanates by gas evolution, such as formic acid for example.

Suitable flame retardants for the purposes of this invention are preferably liquid organophosphorus compounds, such as halogen-free organic phosphates, e.g., triethyl phosphate (TEP), halogenated phosphates, e.g., tris(1-chloro-2-propyl) phosphate (TCPP) and tris(2-chloroethyl) phosphate (TCEP) and organic phosphonates, e.g., dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as melamine and expandable graphite.

The formulations of the present invention can be processed into foams by any method familiar to a person skilled in the art, for example by manual mixing or preferably means of high pressure foaming machines. Batch processes can be used, for example for manufacture of molded foams, refrigerators and panels, or continuous processes, for example in the case of insulation plates, metal composite elements, blocks or in the case of spraying processes.

A special case is that of the 1- and 1,5-component can foams which each employ a polyurethane prepolymer. The siloxane-containing compositions of the present invention are also useful as foam stabilizer in this application.

The polyurethane foams of the present invention are notable for including/containing a siloxane-containing composition according to the present invention. The mass fraction of compounds of formula (I) in the final polyurethane foam is preferably in the range from 0.01% to 10% by weight and more preferably in the range from 0.1% to 3% by weight.

The polyurethane foams of the present invention may be for example a rigid polyurethane foam, a flexible polyurethane foam, a viscoelastic foam, an HR foam, a semirigid polyurethane foam, a thermoformable polyurethane foam or an integral foam. Polyurethane must here be understood as a generic term for a polymer obtained from di- or polyisocyanates and polyols or other isocyanate-reactive species, for example amines, in that the urethane bond need not be the only or predominant type of bond. Polyisocyanurates and polyureas are also expressly included.

In a preferred embodiment the foams obtained according to the present invention are closed-cell foams.

The polyurethane foams of the present invention can be used as constituent parts of or in and/or as, for example, refrigerator insulation, insulation panels, sandwich elements, tube insulation, spray foam, 1- and 1.5-component can foam, wood imitation, modelling foam, packaging foam, mattresses, furniture cushioning, automotive seat cushioning, headrest, dashboard, automotive interior, automotive roof liner, sound absorption material, steering wheel, shoe sole, carpet backing foam, filter foam, sealing foam and adhesive.

Further subjects and embodiments of the invention will be apparent from the claims, the disclosure content of which is fully part of the description.

The subject method for producing the polyurethane foams, the polyurethane foams themselves and also uses thereof are hereinbelow described by way of example without the intention to restrict the invention to these exemplary embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. Where documents are cited in the context of the present description, their content shall fully belong to the disclosure content of the present invention. The examples which follow describe the present invention by way of example without any intention to restrict the invention, the scope of which is apparent from the entire description and the claims, to the embodiments mentioned in the examples.

EXAMPLES

Preparing Inventive Siloxanes

Inventive siloxanes of formula (I) are obtainable via the prior art methods of reacting with appropriate hydrosiloxanes by hydrosilylation.

Allyl polyethers and olefins were reacted to form compounds of formula (I). The method used was similar to example 7 of DE 1020070554852 and hence in agreement with the prior art for preparing SiC-linked polyether siloxanes as also described in EP 1520870 for example.

Table 1 summarizes the polyethers used.

TABLE 1

Allyl polyethers used for preparing the compounds in table 2 (x = ethylene oxide units, y = propylene oxide units, R" = end group)

| Polyether | Initiator | R" | x= | y= |
|---|---|---|---|---|
| PE 1 | allyl alcohol | —H | 11 | 0 |
| PE 2 | allyl alcohol | —H | 9 | 3 |
| PE 3 | allyl alcohol | —H | 13 | 4 |
| PE 4 | allyl alcohol | —H | 12 | 9 |
| PE 5 | hydroxyethyl-vinyl ether | —H | 15 | 7 |
| PE 6 | allyl alcohol | —H | 13 | 14 |
| PE 7 | allyl alcohol | —$CH_3$ | 10 | 0 |
| PE 9 | allyl alcohol | —H | 36 | 38 |

The structure of the resulting compound of formula (I) is discernible from table 2. The parameters listed in table 2 relate to formula (I) as mentioned above

TABLE 2

Siloxanes of examples 1 to 10, containing compounds of formula (I)

| Ex. | R | Σa | R¹ | R⁴ | Σb | Σc | Σd | R² |
|---|---|---|---|---|---|---|---|---|
| 1 | $CH_3$ | 44 | PE 2 | $CH_3$ | 5 | 0 | ≪ 1 | R |
| 2 | $CH_3$ | 65 | PE 4 | $CH_3$ | 4 | 0 | ≪ 1 | R |
| 3 | $CH_3$ | 50 | PE 1 )¹ | $CH_3$ | 8 | 0 | ≪ 1 | R¹ |
| 4 | $CH_3$ | 20 | PE 1 | $CH_3$ | 2 | 0 | ≪ 1 | R |
| 5 | $CH_3$ | 40 | PE 7 | $CH_3$ | 5 | 0 | ≪ 1 | R |
| 6 | $CH_3$ | 65 | PE 6/PE 8 )² | $CH_3$ | 5 | 0 | ≪ 1 | R¹ |
| 7 | $CH_3$ | 40 | PE 6/PE 8 )³ | $CH_3$ | 3 | 0.5 | 2 | R¹ |
| 8 | $CH_3$ | 40 | PE 3 | $CH_3$ | 3 | 0 | 1 | R |
| 9 | $CH_3$ | 40 | PE 3 | $C_8H_{17}$ | 3 | 0.5 | 2 | R¹ |
| 10 | $CH_3$ | 40 | PE 5 | $CH_3$ | 4 | 0 | ≪ 1 | R¹ |

)¹ mixture consisting of 80 eq % PE 1 + 20 eq % $C_{16}$-olefin
)² mixture consisting of 60 eq % PE 6 + 40 eq % PE 8
)³ mixture consisting of 50 eq % PE 4 + 50 eq % PE 1

Foaming Examples:

The following foam formulation was used to performance-test the inventive formulations:

TABLE 3

Formulations for rigid foam applications (rigid, foam panel/insulation plate) in parts by mass

| Formulation | A: PUR flow formulation | B: PIR insulation panel |
|---|---|---|
| polyol | polyether polyol mixture 100 parts | Stepanpol ® PS 2352* 100 parts |
| tris(1-chloro-2-propyl) phosphate | — | 15 parts |
| N,N,N',N'',N''-pentamethyldiethylene triamine | 0.2 part | 0.2 part |
| N,N-dimethylcyclohexylamine | 2.0 parts | — |
| potassium octoate (75 wt % in diethylene glycol) | — | 4.0 parts |
| water | 2.0 parts | 0.8 part |
| 1,3,3,3-tetrafluoropropene (E-isomer) | 3.0 parts | 4.0 parts |
| 1-chloro-3,3,3-trifluoropropene (E isomer) | 12.0 parts | 18.0 parts |
| 1,2,3,3,3-pentafluoropropene | 3.0 parts | 4.0 parts |
| siloxane | 2.0 parts | 2.0 parts |
| Desmodur 44V20L** | 140 parts | 200 parts |

*polyester polyol from Stepan
**polymeric MDI from Bayer, 200 mPa * s, 31.5% NCO, functionality 2.7

Foaming tests were carried out by hand mixing. For this purpose, the A and B formulations described in table 3 were prepared with various siloxanes and weighted into a beaker. The MDI was then added, the reaction mixture was stirred with a 6 cm diameter plate stirrer at 3000 rpm for 5 seconds and immediately transferred into a thermostated 50 cm×25 cm×5 cm aluminum mold lined with polyethylene film at 50° C. The amount of foam formulation used was determined such that it was 10% above the minimum quantity necessary to fill the mold.

One day after foaming, the foams were analyzed. They were inspected from the top and the bottom to evaluate the surfaces and, after cutting open, the internal defects against a subjective scale from 1 to 10, where 10 represents an undisrupted foam and 1 represents an extremely disrupted foam. The pore structure (average number of cells per 1 cm) was visually assessed on a cut face by comparison with reference foams.

The results are compiled in table 4. The siloxanes used, the foam formulations, and also the visual assessment and the pore structure of the foams are summarized.

TABLE 4

Results of foaming tests

| Example | Siloxane from Ex. | Foam formula | Assessment top/bottom/inside | Cells/cm |
|---|---|---|---|---|
| 11 | 1 | A | 7/9/8 | 46-50 |
| 12 | 2 | B )⁴ | 8/8/7 | 46-50 |
| 13 | 3 | B )⁴ | 7/9/8 | 46-50 |
| 14 | 4 | B | 6/8/9 | 46-50 |
| 15 | 5 | B | 7/7/9 | 46-50 |
| 16 | 6 | B )⁴ | 6/7/8 | 41-45 |
| 17 | 7 | B | 8/8/7 | 41-45 |
| 18 | 8 | B | 8/9/8 | 46-50 |
| 19 | 9 | B | 7/9/8 | 46-50 |
| 20 | 10 | A | 7/9/8 | 46-50 |

)⁴ The foam formulation was stored together with the siloxane at 50° C. for 3 days before foaming The data of table 4 show that siloxanes according to the present invention lead to high-quality foams when used in formulations containing halogenated olefins as blowing agents. Even after aging the ready-formulated polyol component with stabilizer, flawless foams were obtained. Such a result was unattainable according to Example 2 of US 2009/0099272.

What is claimed is:

1. A method for producing polyurethane foams comprising reacting at least one organic isocyanate containing two or more isocyanate functions, at least one polyol containing two or more isocyanate-reactive groups, and a blowing agent consisting of at least one halogenated olefin and at least one siloxane of formula (I):

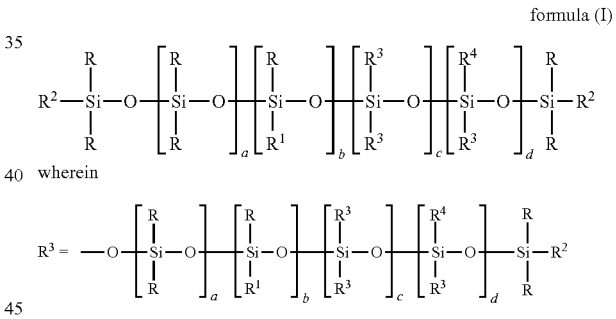

formula (I)

wherein $$R^3 = -O-\begin{bmatrix}R\\|\\Si-O\\|\\R\end{bmatrix}_a\begin{bmatrix}R\\|\\Si-O\\|\\R^1\end{bmatrix}_b\begin{bmatrix}R^3\\|\\Si-O\\|\\R^3\end{bmatrix}_c\begin{bmatrix}R^4\\|\\Si-O\\|\\R^3\end{bmatrix}_d\begin{matrix}R\\|\\Si-R^2\\|\\R\end{matrix}$$

a in each occurrence independently is from 1 to 300,
b in each occurrence independently is from 1 to 50,
c in each occurrence independently is >0 to 4,
d in each occurrence independently is >0 to 4,
with the proviso that, per molecule of formula (I), the average number Σd of T-units and the average number Σc of Q-units per molecule are neither greater than 20, the average number Σa of D-units per molecule is not greater than 1500 and the average number Σb of R¹-bearing siloxy units per molecule is not greater than 50, R in each occurrence independently is one or more than one moiety selected from the group consisting of linear, cyclic or branched, aliphatic or aromatic, saturated or unsaturated hydrocarbon moieties having 1 up to 20 carbon atoms, R² in each occurrence independently is R¹ or R, R¹ is unlike R and in each occurrence independently is an organic moiety and/or a moiety selected from the group consisting of:
    $-CH_2-CH_2-CH_2-O-(CH_2-CH_2O-)_x-$
    $(CH_2-CH(R)O-)_y-R''$ —CH$_2$—O—(CH$_2$—CH$_2$O—)$_x$—(CH$_2$—CH(R$^1$)O—)$_y$—R",
—CH$_2$—R$^{IV}$
—CH$_2$—CH$_2$—CH$_2$—O—CH$_2$—CH(OH)—CH$_2$OH

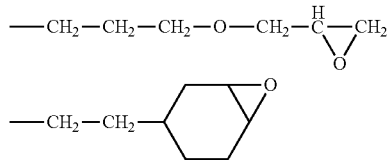

—CH$_2$—CH$_2$—CH$_2$—O—CH$_2$—C(CH$_2$OH)$_2$—CH$_2$—CH$_3$, where
x is from 0 to 100,
x' is 0 or 1,
y is from 0 to 100,
R' in each occurrence independently is an alkyl or aryl group of 1 to 12 carbon atoms, and
R" in each occurrence independently is hydrogen or an alkyl group of 1 to 4 carbon atoms, a —C(O)—R'" group where R'"=alkyl, a —CH$_2$—O—R' group, an alkylaryl group, or a
—C(O)NH—R' group,
R$^{IV}$ is a linear, cyclic or branched hydrocarbon moiety having 1 to 50 carbon atoms,
R$^4$ in each occurrence independently is R, R$^1$ and/or a heteroatom-substituted, functionalized, organic, saturated or unsaturated moiety selected from the group consisting of alkyl, aryl, chloroalkyl, chloroaryl, fluoroalkyl, cyanoalkyl, acryloyloxyaryl, acryloyloxyalkyl, methacryloyloxyalkyl, methacryloyloxypropyl and vinyl,
with the proviso that at least one substituent from R$^1$, R$^2$ and/or R$^4$ is other than R.

2. The method according to claim 1 wherein
R$^1$ in each occurrence independently is an organic moiety
—CH$_2$—CH$_2$—CH$_2$—O—(CH$_2$—CH$_2$O—)$_x$—(CH$_2$—CH(R')O—)$_y$—R",
—CH$_2$—CH$_2$—O—(CH$_2$—CH$_2$O—)$_x$—(CH$_2$—CH(R')O—)$_y$—R", or
—CH$_2$—R$^{IV}$
where
x is from 0 to 100,
y is from 0 to 100,
R' in each occurrence independently is different and is methyl, ethyl and/or phenyl and,
R" in each occurrence independently is hydrogen or an alkyl group of 1 to 4 carbon atoms, a —C(O)—R'" group where R'"=alkyl, a —CH$_2$—O—R' group, an alkylaryl group, or a
—C(O)NH—R' group,
R$^{IV}$ is a linear, cyclic or branched hydrocarbon moiety having 1 to 50 carbon atoms.

3. The method according to claim 1 wherein
R$^1$ in each occurrence independently is an organic moiety selected from the group consisting of:
—CH$_2$—CH$_2$—CH$_2$—O—(CH$_2$—CH$_2$O—)$_x$—(CH$_2$—CH(R')O—)$_y$—R",
—CH$_2$—CH$_2$—O—(CH$_2$—CH$_2$O—)$_x$—(CH$_2$—CH(R')O—)$_y$—R", and
—CH$_2$—R$^{IV}$
where
x is from 0 to 100,
y is from 0 to 100,
R' is methyl and
R" in each occurrence independently is hydrogen or an alkyl group of 1 to 4 carbon atoms, a —C(O)—R'" group where R'"=alkyl, a —CH$_2$—O—R' group, an alkylaryl group, or a —C(O)NH—R' group,
wherein the molar fraction of oxyethylene units comprises at least 70% of the oxyalkylene units,
or the molar fraction of oxyethylene units comprises at most 70% of the oxyalkylene units and R" is hydrogen.

4. The method according to claim 1 wherein at least 10% of the R$^2$ moieties are equal to R$^1$.

5. The method according to claim 1 wherein R is methyl and the a/b ratio is not less than 7.

6. The method according to claim 1 wherein at least one R$^1$ is present and said at least one R$^1$ is —CH$_2$—CH$_2$—CH$_2$—O—(CH$_2$—CH$_2$O—)$_x$—(CH$_2$—CH(R')O—)$_y$—R" or —CH$_2$—CH$_2$—O—(CH$_2$—CH$_2$O—)$_x$—(CH$_2$—CH(R)O—)$_y$—R", wherein y=0 and R" is not hydrogen.

7. A polyurethane foam obtained by a method according to claim 1, wherein said polyurethane foam comprises said at least one siloxane of formula (I) therein.

8. The polyurethane foam according to claim 7, wherein said polyurethane foam is closed-cell.

9. The polyurethane foam according to claim 7, wherein the polyurethane foam is a rigid polyurethane foam, a flexible polyurethane foam, a viscoelastic foam, an HR foam, a semi-rigid polyurethane foam, a thermoformable polyurethane foam or an integral foam.

10. The polyurethane foam according to claim 7 wherein from 0.01% to 10% by weight of said at least one siloxane of formula (I), based on the total weight of the polyurethane foam, is present.

11. The polyurethane foam according to claim 7 wherein from 0.1% to 3% by weight of said at least one siloxane of formula (I), based on the total weight of the polyurethane foam, is present.

12. A composition of matter comprising a polyurethane foam and from 0.01% to 10% by weight of at least one siloxane of formula (I), based on the total weight of the polyurethane foam,

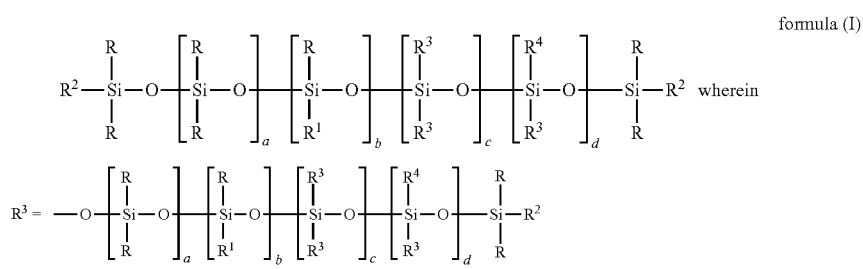

formula (I)

a in each occurrence independently is from 1 to 300,
b in each occurrence independently is from 1 to 50,
c in each occurrence independently is >0 to 4,
d in each occurrence independently is >0 to 4,
with the proviso that, per molecule of formula (I), the average number $\Sigma d$ of T-units and the average number $\Sigma c$ of Q-units per molecule are neither greater than 20, the average number $\Sigma a$ of D-units per molecule is not greater than 1500 and the average number $\Sigma b$ of $R^1$-bearing siloxy units per molecule is not greater than 50,
R in each occurrence independently is one or more than one moiety selected from the group consisting of linear, cyclic or branched, aliphatic or aromatic, saturated or unsaturated hydrocarbon moieties having 1 up to 20 carbon atoms,
$R^2$ in each occurrence independently is $R^1$ or R,
$R^1$ is unlike R and in each occurrence independently is an organic moiety and/or a moiety selected from the group consisting of:
—$CH_2$—$CH_2$—$CH_2$—O—($CH_2$—$CH_2$O)$_x$—($CH_2$—CH(R')O—)$_y$—R"
—$CH_2$—$CH_2$—O—($CH_2$—$CH_2$O—)$_x$—($CH_2$—CH(R')O—)$_y$—R"
—$CH_2$—$R^{IV}$
—$CH_2$—$CH_2$—$CH_2$—O—$CH_2$—CH(OH)—$CH_2$OH

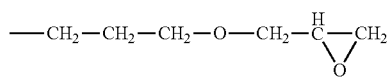

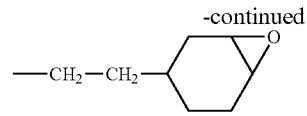

—$CH_2$—$CH_2$—$CH_2$—O—$CH_2$—C($CH_2$OH)$_2$—$CH_2$—$CH_3$, where
x is from 0 to 100,
x' is 0 or 1,
y is from 0 to 100,
R' in each occurrence independently is an alkyl or aryl group of 1 to 12 carbon atoms, and
R" in each occurrence independently is hydrogen or an alkyl group of 1 to 4 carbon atoms, a —C(O)—R'" group where R'"=alkyl, a —$CH_2$—O—R' group, an alkylaryl group, or a —C(O)NH—R' group,
$R^{IV}$ is a linear, cyclic or branched, including further substituted, hydrocarbon moiety having 1 to 50 carbon atoms,
$R^4$ in each occurrence independently is R, $R^1$ and/or a heteroatom-substituted, functionalized, organic, saturated or unsaturated moiety selected from the group consisting of alkyl, aryl, chloroalkyl, chloroaryl, fluoroalkyl, cyanoalkyl, acryloyloxyaryl, acryloyloxyalkyl, methacryloyloxyalkyl, methacryloyloxypropyl and vinyl,
with the proviso that at least one substituent from $R^1$, $R^2$ and/or $R^4$ is other than R.

* * * * *